(12) United States Patent
Krishna et al.

(10) Patent No.: US 9,858,271 B2
(45) Date of Patent: Jan. 2, 2018

(54) SYSTEM AND METHOD FOR TRANSLATING CONTENT BETWEEN DEVICES

(71) Applicant: Ricoh Co., Ltd., Tokyo (JP)

(72) Inventors: Vikas Krishna, San Jose, CA (US); Timothee Bailloeul, Sunnyvale, CA (US); Daniel G. Van Olst, San Francisco, CA (US)

(73) Assignee: Ricoh Company, Ltd., Tokyo (JP)

( * ) Notice: Subject to any disclaimer, the term of this patent is extended or adjusted under 35 U.S.C. 154(b) by 363 days.

(21) Appl. No.: 13/689,761

(22) Filed: Nov. 30, 2012

(65) Prior Publication Data

US 2014/0157113 A1 Jun. 5, 2014

(51) Int. Cl.
*H04L 29/06* (2006.01)
*G06F 17/28* (2006.01)
*G06Q 10/10* (2012.01)

(52) U.S. Cl.
CPC ......... *G06F 17/289* (2013.01); *G06Q 10/101* (2013.01); *G06Q 10/103* (2013.01)

(58) Field of Classification Search
CPC .............. G06F 17/212; G06F 17/211; G06F 17/30905; G06F 17/2247; G06F 17/248; G06F 17/289; G06Q 10/101; G06Q 10/103
USPC ................................ 715/236, 238, 243, 249
See application file for complete search history.

(56) References Cited

U.S. PATENT DOCUMENTS

| | | | | |
|---|---|---|---|---|
| 5,497,319 A | * | 3/1996 | Chong | G06F 17/2264 704/10 |
| 5,530,794 A | * | 6/1996 | Luebbert | G06F 17/24 715/210 |
| 5,537,628 A | * | 7/1996 | Luebbert | G06F 17/24 715/208 |
| 6,407,673 B1 | * | 6/2002 | Lane | H04N 21/41422 340/901 |
| 6,473,523 B1 | * | 10/2002 | Newman et al. | 382/176 |

(Continued)

OTHER PUBLICATIONS

Peter Weverka from PowerPoint 2007, All-in-One Desk Reference for Dummies, How to Translate Text in PowerPoint 2007, www.dummies.com/how-to/content/how-to-translate-text-in-powerpoint-2007.html, downloaded Nov. 9, 2012, 2 pages.

*Primary Examiner* — Scott Baderman
*Assistant Examiner* — Hassan Mrabi
(74) *Attorney, Agent, or Firm* — Patent Law Works LLP

(57) ABSTRACT

A system and method for translating and reformatting content are described. The system includes an enterprise service bus configured to receive a request from a first device to transmit media to a second device, the media including content in a first language. The system also includes network appliance as a service server-side application including a translation service and a formatting service. The translation service receives the request from the enterprise service bus, determines a second language for translation, determines the content for translation and translates the content to the second language. The formatting service generates a new version of the media including the content in the second language, the new version being formatted in a layout similar to an original version of the image. The enterprise services bus transmits the new version of the media to the second device for display.

20 Claims, 10 Drawing Sheets

(56) References Cited

U.S. PATENT DOCUMENTS

| | | | |
|---|---|---|---|
| 7,043,532 B1* | 5/2006 | Humpleman | H04L 12/2805 709/208 |
| 7,069,222 B1* | 6/2006 | Borquez | G06F 17/289 348/14.07 |
| 7,117,152 B1* | 10/2006 | Mukherji | G10L 15/26 704/209 |
| 7,398,214 B2 | 7/2008 | Boegelund | G06F 17/289 704/2 |
| 7,809,549 B1* | 10/2010 | Bangalore et al. | 704/2 |
| 7,904,290 B2* | 3/2011 | Wells | 704/2 |
| 8,335,496 B1* | 12/2012 | Bort | 455/414.4 |
| 8,380,485 B1* | 2/2013 | Callahan | 704/1 |
| 8,407,736 B2* | 3/2013 | McClenny | G08B 27/005 340/286.02 |
| 8,515,728 B2* | 8/2013 | Boyd | G06F 17/28 704/2 |
| 8,782,394 B2* | 7/2014 | O'Neil | H04L 63/083 380/270 |
| 8,799,352 B2* | 8/2014 | Cohen | 709/203 |
| 2003/0120478 A1* | 6/2003 | Palmquist | 704/3 |
| 2003/0171096 A1* | 9/2003 | Ilan et al. | 455/3.06 |
| 2004/0102957 A1* | 5/2004 | Levin | G06F 17/2735 704/3 |
| 2004/0210444 A1* | 10/2004 | Arenburg et al. | 704/277 |
| 2005/0267738 A1* | 12/2005 | Wilkinson | G06F 17/275 704/9 |
| 2006/0217954 A1* | 9/2006 | Koyama | G06F 17/289 704/2 |
| 2006/0218484 A1* | 9/2006 | Saito | G06F 17/241 715/236 |
| 2006/0241982 A1* | 10/2006 | Seifert et al. | 705/4 |
| 2007/0225966 A1* | 9/2007 | Suen | G06F 9/4448 704/9 |
| 2007/0255554 A1* | 11/2007 | Cai | G06F 17/289 704/9 |
| 2008/0016112 A1* | 1/2008 | Reddy et al. | 707/104.1 |
| 2008/0221862 A1* | 9/2008 | Guo | G06F 17/289 704/2 |
| 2008/0243473 A1* | 10/2008 | Boyd | G06F 17/28 704/2 |
| 2008/0260210 A1* | 10/2008 | Kobeli et al. | 382/114 |
| 2009/0089042 A1* | 4/2009 | Wald et al. | 704/2 |
| 2010/0106482 A1* | 4/2010 | Hardacker et al. | 704/3 |
| 2010/0231938 A1* | 9/2010 | Ohguro | G06F 17/211 358/1.9 |
| 2010/0331043 A1* | 12/2010 | Chapman et al. | 455/556.1 |
| 2011/0022379 A1* | 1/2011 | Bangalore | G06F 17/289 704/3 |
| 2011/0252315 A1* | 10/2011 | Misawa | G06F 17/2235 715/256 |
| 2011/0252316 A1* | 10/2011 | Pahud et al. | 715/264 |
| 2011/0307241 A1* | 12/2011 | Waibel | G10L 15/265 704/2 |
| 2012/0069131 A1* | 3/2012 | Abelow | G06Q 10/067 348/14.01 |
| 2012/0117461 A1* | 5/2012 | Sata | G06F 17/211 715/243 |
| 2012/0136718 A1* | 5/2012 | Katti | 705/14.49 |
| 2012/0163266 A1* | 6/2012 | Rodkey | H04W 4/10 370/312 |
| 2012/0209589 A1* | 8/2012 | Baek | H04L 12/58 704/3 |
| 2013/0021346 A1* | 1/2013 | Terman | 345/467 |
| 2013/0124186 A1* | 5/2013 | Donabedian | G06F 17/289 704/2 |
| 2013/0182182 A1* | 7/2013 | Mountain | 348/564 |
| 2013/0205337 A1* | 8/2013 | McClenny | G08B 27/005 725/33 |
| 2013/0268490 A1* | 10/2013 | Keebler | G06F 17/30575 707/627 |
| 2014/0088740 A1* | 3/2014 | Ellis | A61B 5/1038 700/91 |
| 2014/0104075 A1* | 4/2014 | Ellis | A61B 5/1038 340/870.01 |
| 2014/0111542 A1* | 4/2014 | Wan | G06F 17/30253 345/633 |
| 2014/0162598 A1* | 6/2014 | Villa-Real | H04M 1/66 455/411 |
| 2014/0350915 A1* | 11/2014 | Bangalore et al. | 704/2 |
| 2015/0237300 A1* | 8/2015 | Mendis | H04L 65/1059 348/14.11 |
| 2015/0242873 A9* | 8/2015 | Patel | G06Q 30/0214 705/14.16 |

* cited by examiner

SYSTEM AND METHOD FOR TRANSLATING CONTENT BETWEEN DEVICES

BACKGROUND OF THE INVENTION

1. Field of the Invention

The specification relates to a system and method for translating and reformatting content. In particular, the specification relates to directing content from a first device to be displayed on a second device and reformatting and translating the content.

2. Description of the Background Art

Consumers have a variety of consumer electronic devices to choose from. A problem arises, however, because many of these devices are incompatible. One solution is to purchase a host of products that are all produced by the same corporation. For example, consumers can purchase an iPhone for mobile needs, a Macintosh for a laptop, an Apple Airport for managing the WiFi devices and an AppleTV for watching television. These products, however, are more expensive than other devices and impractical for businesses.

For example, when a business organizes a meeting in a conference room, employees use mobile devices, the room includes a projector for projecting slides and other users connect to the meeting remotely using their laptops. The remote users can employ video conferencing software to view the slides in real-time, however the software frequently malfunctions, the access code for the meeting is not sent to all the participants, etc.

In addition, remote users might be located in a different country or generally prefer to view materials that are in their native language. Prior art systems exist that can translate the presentation, which the meeting coordinator can then send to the remote participants, but this is time consuming and can lead to mistakes if the meeting coordinator does not have the complete list of meeting participants.

SUMMARY OF THE INVENTION

The invention overcomes the deficiencies of the prior art with a system for translating and reformatting content. In one embodiment, the system includes an enterprise service bus executable by one or more processors, the enterprise service bus configured to receive a request from a first device to transmit media to a second device, the media including content in a first language. The system also includes network appliance as a service (NAaaS) server-side application services configured to receive the request from the enterprise service bus, determine a second language for translation, determine the content for translation, translate the content to the second language and generate the new version of the media including the content in the second language, the new version formatted in a layout similar to an original version of the image. The enterprise service bus transmits the new version of the media to the second device for display.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
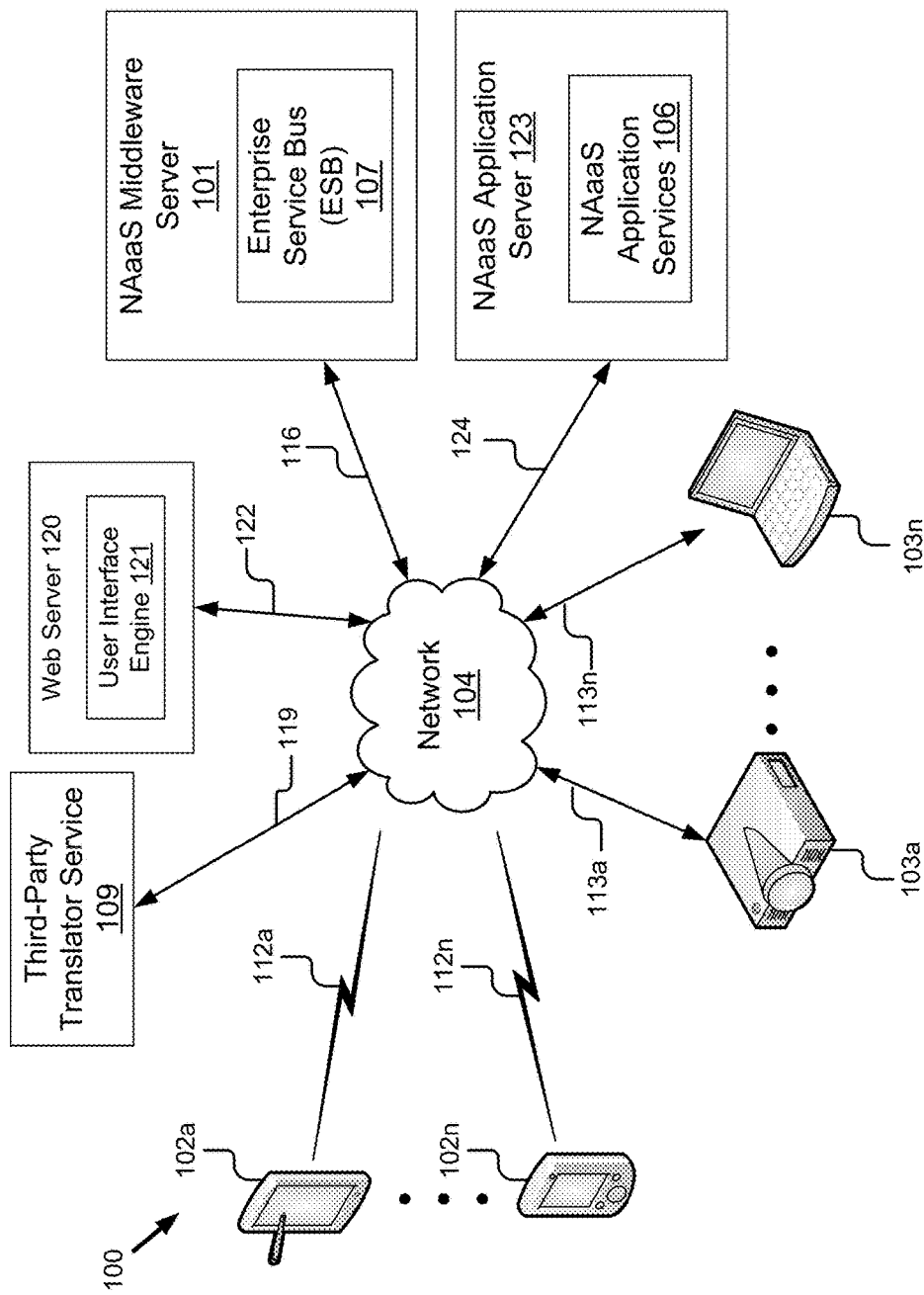
FIG. 1A is a high-level block diagram illustrating one embodiment of a system for translating and reformatting content.

A system and method for translating and reformatting content are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1A illustrates a high-level block diagram of a system 100 for translating and reformatting content according to one embodiment. The illustrated embodiment of the system 100 comprises: user devices 102a-102n, collaborative computing devices 103a-103n, a network 104, a web server 120, a third-party translator service 109, a Network Appliance As A Service (NAaaS) middleware server 101 and a NAaaS application server 123. In FIG. 1A and the remaining figures, a letter after a reference number, for example, "102a" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the plurality of user devices 102a-102n, the plurality of collaborative computing devices 103a-103n, the web server 120, the NAaaS application server 123 and the NAaaS middleware server 101, in practice any number of networks 104 can be connected to the entities.

The user devices 102a-102n are devices associated with a particular user. For example, a company provides its employees with a mobile device or a laptop. The user devices 102a-102n are each coupled to the network 104 via signal lines 112a-112n respectively. The user device 102 is any computing device including a memory, a processor and a communication capability. For example, the user device 102 can be a tablet computer, a personal digital assistant, a smart phone, a feature phone, etc. The user devices 102 can communicate with the network 104 wirelessly or through wired connectivity. The user devices 102 include one or more user applications (not shown) that generate messages to be processed by the enterprise service bus 107.

The user device 102 is adapted for sending and receiving data to and from the NAaaS middleware server 101. For example, the user device 102 sends a command to project an image of a presentation program document on at least one of the plurality of collaborative computing devices 103a-103n to the NAaaS middleware server 101. The user device 102 includes a display for viewing information provided by the enterprise service bus 107. For example, the user device 102 receives graphical data from the NAaaS middleware server 101 for listing the plurality of collaborative computing devices 103a-103n for display on the user device 102.

The user device 102 determines its location so that the user device 102 can interact with other user devices 102 or collaborative computing devices 103 via the NAaaS middleware server 101. The user device 102 determines its location information by using global positioning system (GPS) circuitry included within the device itself to determine its location. For determining the user device's 102 location indoors, the user device 102 employs radio frequency, ultra-sound signal or invisible light communication. For example, the user device 102 determines its location through wireless access points based on measuring the intensity of received signals. The user device 102 accesses a database including pairs of media access control (MAC) addresses and locations over the Internet. To determine a location, the user device 102 retrieves the location corresponding to the access point MAC address from the database.

In another embodiment, the user device 102 performs a device discovery process that works via the network 104 using specific protocols like SNMP, ICMP, Bonjour, etc. For example, the user device 102 queries the NAaaS middleware server 101 to discover devices. The NAaaS middleware server 101 uses SNMP or ICMP protocols to discover devices and reports back to the user device 102 with the found devices together with their internet protocol (IP) address, media access control (MAC) addresses, etc.

The collaborative computing devices 103a-103n are devices associated with a particular location and/or a particular function. Collaborative computing devices 103a-103n can be assigned to a conference room or are assigned for meetings. For example, a projector and an interactive whiteboard can be assigned to a select conference room from a plurality of conference rooms inside a building. The collaborative computing devices 103a-103n are each coupled to the network 104 via signal lines 113a-113n respectively. The collaborative computing device 103 is any computing device including a memory and a processor. For example, the collaborative computing device 103 can be a projector, a monitor, a television, an interactive whiteboard, a webcam, a microphone, a loudspeaker, a CD/DVD player, an electronic paper device, an electronic reader, a desktop computer, a tablet, a smartphone, etc.

The collaborative computing device 103 is adapted for sending and receiving data to and from the NAaaS middleware server 101. For example, a projector in a conference room can receive a presentation program document from the NAaaS middleware server 101. In another example, a video conferencing device including a webcam, a microphone and a monitor in a first location can capture a real-time audio-video synchronous communication data stream and send it to another video conferencing device in a second location through the enterprise service bus 107 in the NAaaS middleware server 101.

The NAaaS middleware server 101 is any computing device including a memory and a processor which is connected to the network 104 via signal line 116. The NAaaS middleware server 101 comprises an enterprise service bus 107. The enterprise service bus is described in further detail below with reference to FIG. 2A.

The enterprise service bus 107 includes code and routines for providing a standard interface to one or more networks of disparate devices and their corresponding server clouds that are deployed independently to communicate with each other. In one embodiment, the enterprise service bus 107 executes one or more services including invocation support, routing (e.g., content based routing, static/deterministic routing, policy based routing, rules based routing) mediation, message queue (e.g., publish-subscribe), process choreography, service orchestration, complex event processing, security and management (e.g., monitoring, logging). The enterprise service bus 107 also calls methods contained in the code on the NAaaS application services 106 that implement the services. For example, the enterprise service bus 107 instructs the NAaaS application services 106 to authenticate users, log device usage entries, store media, analyze media, index keywords related to users' skills and search a database for user profiles that include skills that match a user query.

The user devices 102a-102n or the collaborative computing devices 103a-103n use a particular messaging format over a particular communication protocol to communicate with and send service requests to each other through the enterprise service bus 107. A message format defines the structure and form of the message. For example, message formats include eXtensible Markup Language (XML), Javascript Object Notation (JSON), etc. A communication protocol defines a set of rules governing the syntax, semantics, and synchronization of communications. For example, communication protocols include File Transfer Protocol (FTP), Hypertext Transfer Protocol (HTTP), Message Queue (MQ), Internet Inter-Orb Protocol (HOP), Simple Object Access Protocol (SOAP), etc. While the enterprise service bus 107 and the NAaaS application services 106 are illustrated as being on separate servers, in one embodiment they are on the same server.

The NAaaS application server 123 is any computing device including a memory and a processor which is connected to the network 104 via signal line 124. The NAaaS application server 123 includes NAaaS application services 106, which is a collection of implementation services that are abstracted as an application and composed by the enterprise service bus 107 in order to deliver higher level services. The NAaaS application services 106 are described in further detail below with reference to FIG. 2B.

The web server 120 is any computing device including a memory and a processor that is connected to the network 104 via signal line 122. The web server 120 comprises a user interface engine 121. While the web server 120 is illustrated in FIG. 1A as being a separate server, in some embodiments the user interface engine 121 could be stored on a user device 102 or function as a standalone application.

The user interface engine 121 is software and routines for generating graphical data for displaying a user interface. In one embodiment, the user interface engine 121 is a set of instructions executable by the processor to provide the functionality described below for generating graphical data for displaying a user interface. In another embodiment, the user interface engine 121 is stored in the memory and is accessible and executable by the processor.

Figure 3:
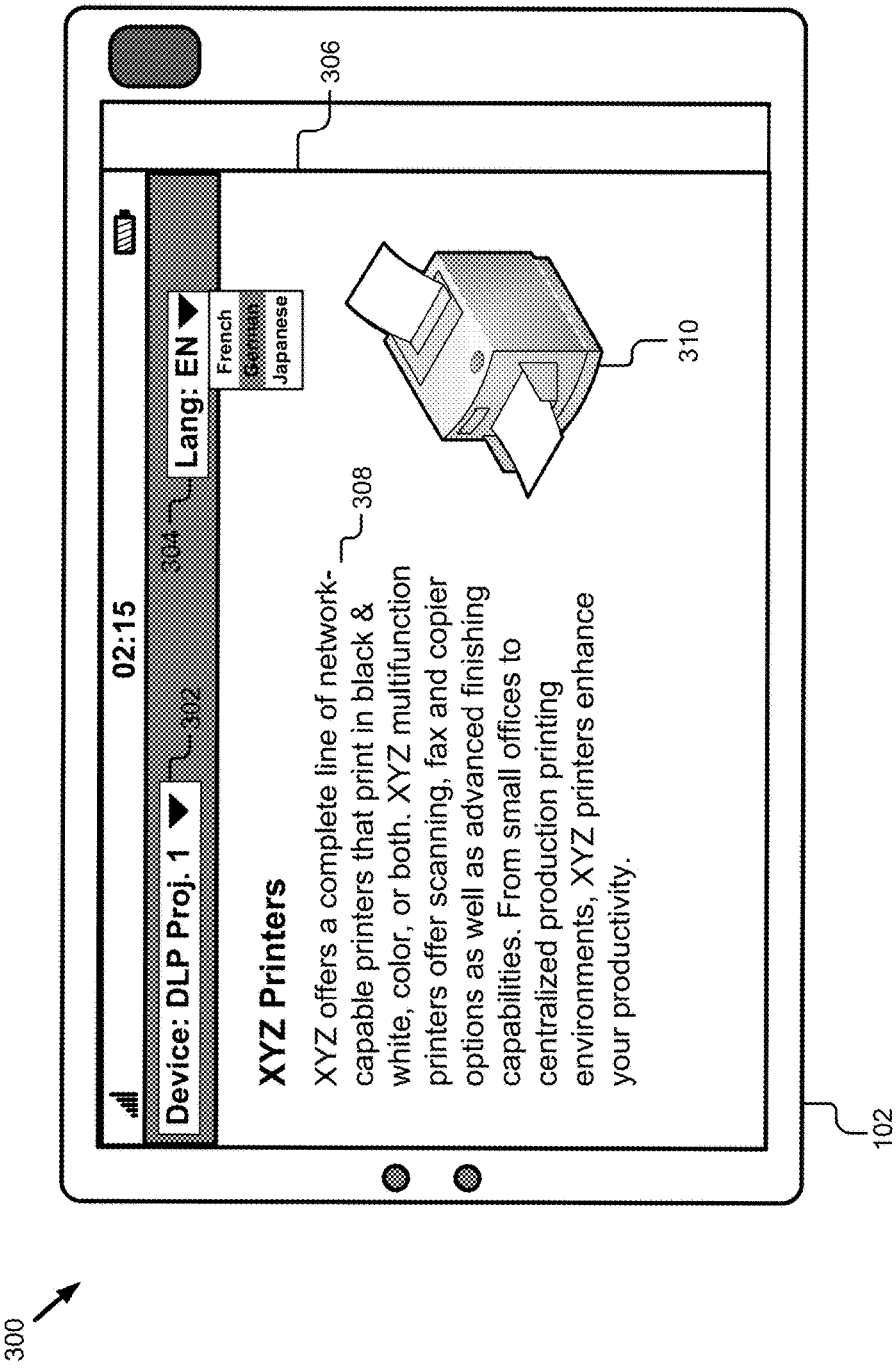
FIG. 3 is a graphic representation of one embodiment of a user interface for specifying a language for translating content.

The user interface engine 121 receives a request for generating graphical data for displaying information for controlling collaborative computing devices 103. For example, the user interface engine 121 generates graphical data for displaying a webpage for selecting a language to translate a slide into for a collaborative computing device 103. The user inputs information and the user interface engine 121 transmits the information to the enterprise service bus 107, which determines the action to be performed. For example, if the user device 102 transmits an instruction for a projector to project an image contained in the request, the user interface engine 121 transmits the request to the enterprise service bus 107, which transmits the request to the projector and instructs the NAaaS application services 106 to perform other actions on the request. FIG. 3 include an example user interface.

The third-party translator service 109 is any computing device including a memory and a processor which is connected to the network 104 via signal line 119. In one embodiment, the third-party translator service 109 sends and receives data to and from the NAaaS middleware server 101 via the network 104. For example, the third-party translator service 109 provides a translator service to the NAaaS middleware server 101. The third-party translator service 109 comprises code and routines configured to receive data including text in a first language from the NAaaS middleware server 101. The third-party translator service 109 translates the text to a second language. The third-party translator service 109 transmits the translated texted to the NAaaS middleware server 101.

Figure 1B:
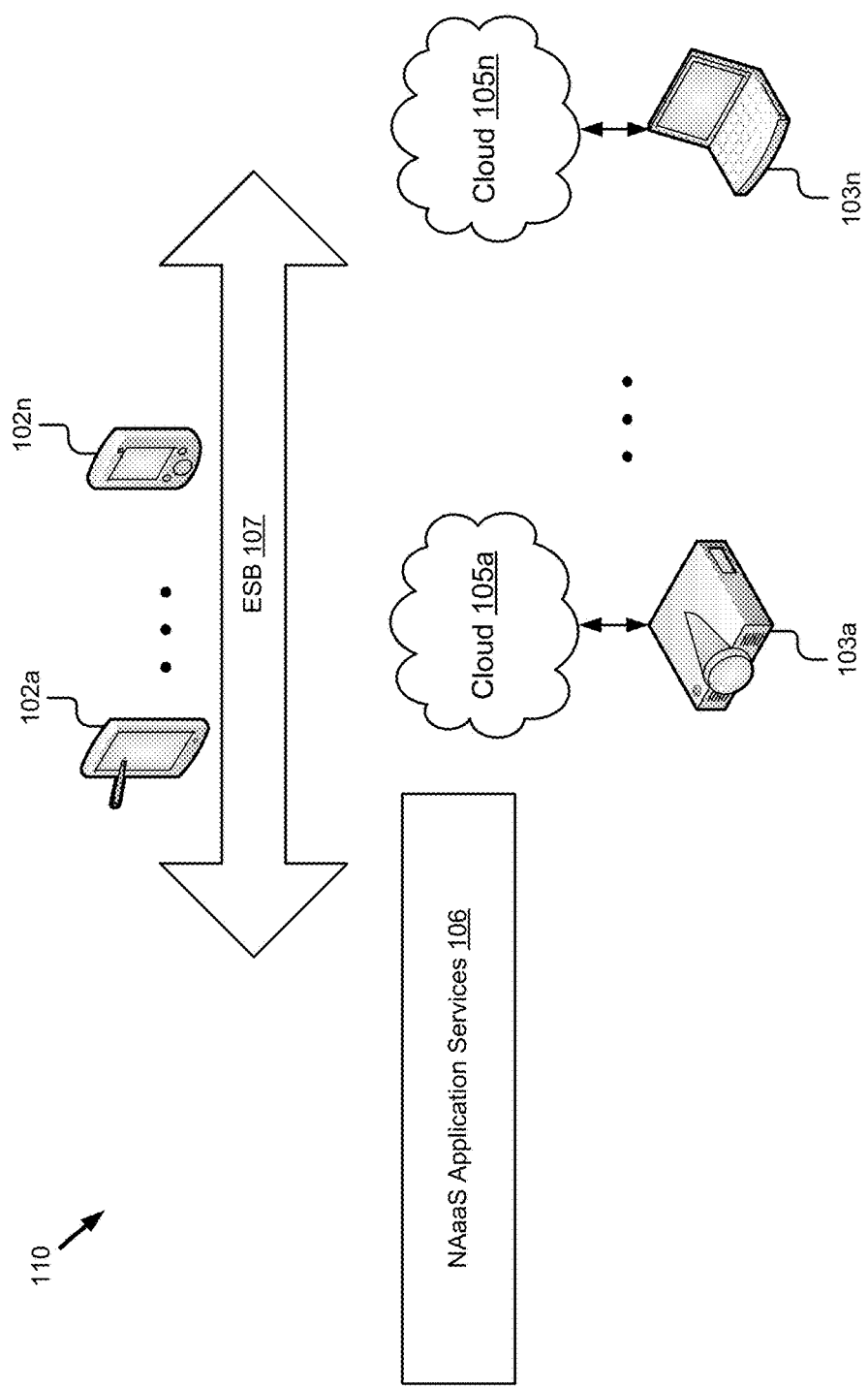
FIG. 1B is a high-level block diagram illustrating another embodiment of a system for translating and reformatting content.

FIG. 1B illustrates another high-level block diagram of a system 110 for translating and reformatting content according to one embodiment. The illustrated embodiment of the system 110 comprises: user devices 102a-102n as a first layer, the enterprise service bus 107 as a second layer and the NAaaS application services 106, the collaborative computing devices 103a-103n and their corresponding server clouds 105a-105n as a third layer. Each one of the server clouds 105a-105n store a copy of the media type and index the media type associated with the corresponding collaborative computing devices 103a-103n whenever the collaborative computing devices 103a-103n execute a transaction in response to a request. For example, a projector cloud server stores a projected presentation program document, a video conferencing cloud server stores a video recording of the video conference and an interactive whiteboard cloud server stores an image of the interactive whiteboard.

The enterprise service bus 107 layer processes requests coming in from the user devices 102a-102n layer and relays the requests to the NAaaS application services 106 for processing and the collaborative computing devices 103a-103n and their corresponding server clouds 105a-105n. In one embodiment, the enterprise service bus 107 layer comprises one or more ports that provide an interface for user applications on the user devices 102a-102n to connect with the enterprise service bus 107 layer to send messages and receive responses. In another embodiment, the enterprise service bus 107 layer comprises one or more ports to communicate with the NAaaS application services 106 layer and the collaborative computing devices 103. In one embodiment, a port on the enterprise service bus 107 may be of a particular port type that handles only messages and communications of a particular message format and communication protocol of a user application. In another embodiment, a port on the enterprise service bus 107 may be of a universal port type that includes a generic interface to the enterprise service bus 107 and can handle any messaging format and communication protocol combination.

Enterprise Service Bus

Figure 2A:
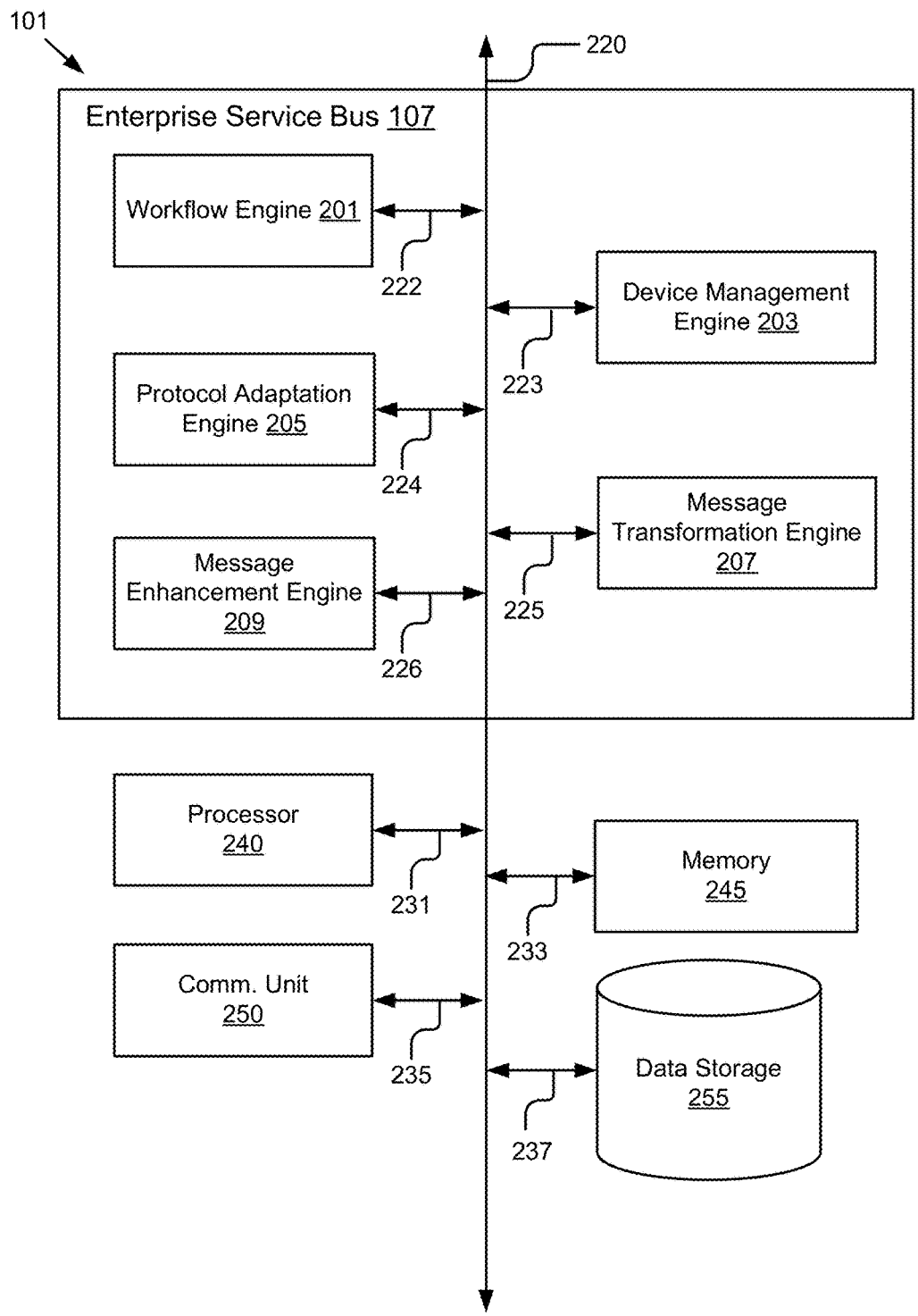
FIG. 2A is a block diagram illustrating one embodiment of an enterprise service bus.

Referring now to FIG. 2A, an example of the enterprise service bus 107 is shown in more detail. FIG. 2A is a block diagram of a NAaaS middleware server 101 that includes: a processor 240, a memory 245, a communication unit 250, a data storage 255 and the enterprise service bus 107.

The processor 240, the memory 245, the communication unit 250, the data storage 255 and the enterprise service bus 107 are communicatively coupled to the bus 220. The bus 220 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 220 for communication with the other components of the NAaaS middleware server 101 via signal line 231. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 220 for communication with the other components of the NAaaS middleware server 101 via signal line 233. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 250 is hardware for receiving and transmitting data by linking the processor 240 to the network 104 and other processing systems. The communication unit 250 receives data such as images, videos, or documents from a plurality of user devices 102a-102n. The communication unit 250 also receives requests for user profiles associated with a skill from the web server 120. The communication unit 250 transmits information to the plurality of collaborative computing devices 103a-103n. For example, the communication unit 250 transmits graphical data for displaying images or videos. The communication unit 250 is coupled to the bus 220 for communication with the other components of the NAaaS middleware server 101 via signal line 235.

In one embodiment, the communication unit 250 includes a port for direct physical connection to the user devices 102, the collaborative computing devices 103, the NAaaS application server 123, the web server 120 or to another communication channel. For example, the communication unit 250 includes an RJ14 or similar port for wired communication with the ESB 107. In another embodiment, the communication unit 250 includes a wireless transceiver for exchanging data with the user devices 102 or any other communication channel using one or more wireless communication methods, such as IEEE 802.11, IEEE 802.16, Bluetooth® or another suitable wireless communication method.

In yet another embodiment, the communication unit 250 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 250 includes a wired port and a wireless transceiver. The communication unit 250 also provides other conventional connections to the network for distribution of files and/or media objects using standard network protocols such as TCP/IP, FTP, HTTP, HTTPS and SMTP as will be understood to those skilled in the art.

The data storage 255 is a non-transitory memory that stores data for the functionality of the NAaaS middleware server 101. The data storage 255 is coupled to the bus 220 for communication with other components of the NAaaS middleware server 101 via signal line 237.

In one embodiment, the data storage 255 stores a library of communication protocols and messaging formats for protocol conversion. The communication protocols and messaging formats that the data storage 255 stores include, for example, Simple Object Access Protocol (SOAP), eXtensible Markup Language (XML), Java Message Service (JMS), File Transfer Protocol (FTP), Hypertext Transfer Protocol (HTTP), Message Queue (MQ), Internet Inter-Orb Protocol (HOP), Representational State Transfer (REST), JavaScript Object Notation (JSON), Distributed Component Object Model (DCOM), etc. In some embodiments, the protocol adaptation engine 205 accesses the protocols to convert requests into a protocol that is compatible with the recipient.

The enterprise service bus 107 includes: a workflow engine 201, a device management engine 203, a protocol adaptation engine 205, a message transformation engine 207 and a message enhancement engine 209. These components of the enterprise service bus 107 are communicatively coupled to each other via the bus 220.

The workflow engine 201 is software and routines for performing basic enterprise service bus functionalities and for handling communications between the components of the NAaaS middleware server 101 and other components of the system 100. In one embodiment, the workflow engine 201 is a set of instructions executable by the processor 240 to provide the functionality described below for receiving a request, routing the request, performing several steps and interacting with the NAaaS application services 106 and the collaborative computing devices 103 to satisfy the request. In either embodiment, the workflow engine 201 is adapted for cooperation and communication with the processor 240, the communication unit 250 and other components of the NAaaS middleware server 101 via the signal line 222.

The workflow engine 201 receives a request, processes the request and communicates with the NAaaS application services 106 and the collaborative computing devices 103 to complete the request. For example, the workflow engine 201 receives a request from a user device 102 for one of the collaborative computing devices 103 to project a translated image. The workflow engine 201 authenticates the user associated with the user device 102 by interacting with the user management service 211 that is part of the NAaaS application services 106, instructing the device usage analytics service 213 to log the command, a user identifier for the user associated with the user device 102, the date and time of the request and the IP address of the user device 102, copying the image that the user sent to the repository by interacting with the media repository service 215, performing optical character recognition by interacting with the media analysis service 217, translating the text identified previously by the media analysis service 217 by interacting with the translation service 219, formatting the translated text by interacting with the formatting service 221 and transmitting the image to the collaborative computing device 103 for projection of the translated and formatted text.

The workflow engine 201 receives information via the communication unit 250 and transmits the information to the appropriate component of the enterprise service bus 107 or components of the system 100. In one embodiment, the workflow engine 201 receives a request to transmit media to a collaborative computing device 103. The workflow engine 201 can receive one or more types of media. The workflow engine 201 routes or transmits the media to the collaborative computing device 103. For example, the workflow engine 201 receives an image from a user device 102 (e.g., a smart phone) for display by a collaborative computing device 103 (e.g., a projector or a monitor).

The device management engine 203 is code and routines for determining functionality associated with the one or more types of devices. In one embodiment, the device management engine 203 is a set of instructions executable by the processor 240 to provide the functionality described below for determining functionality associated with the one or more types of devices. In another embodiment, the device management engine 203 is stored in the memory 245 and is accessible and executable by the processor 240. In either embodiment, the device management engine 203 is adapted for cooperation and communication with the processor 240, the communication unit 250, the workflow engine 201 and other components of the NAaaS middleware server 101 via signal line 223.

In one embodiment, the device management engine 203 determines a list of functions associated with each of the plurality of devices. For example, the list of functions include power on, power off, projection, zoom, enhance, automatic focus, print, two-way video recording and transmission, two-way audio recording and transmission, language translation, text to speech translation and speech to text translation, etc.

The protocol adaptation engine 205 is software and routines for adapting and translating protocols. In one embodiment, the protocol adaptation engine 205 is a set of instructions executable by the processor 240 to provide the functionality described below for adapting and translating protocols. In either embodiment, the protocol adaptation engine 205 is adapted for cooperation and communication with the processor 240, the communication unit 250 and other components of the NAaaS middleware server 101 via the signal line 224.

In one embodiment, the protocol adaptation engine 205 receives a request from the workflow engine 201 in a first communication protocol and performs adaptation and translation to make the communication protocol compatible with the recipient of the request. For example, the protocol adaptation engine 205 receives an HTTP request from the user device 102 to "turn off" a projector. The projector communicates using TCP. The protocol adaptation engine 205 adapts an HTTP request to be forwarded to the projector using the TCP protocol.

The message transformation engine 207 is software and routines for transforming messages. In one embodiment, the message transformation engine 207 is a set of instructions executable by the processor 240 to provide the functionality described below for transforming messages. In either embodiment, the message transformation engine 207 is adapted for cooperation and communication with the processor 240, the communication unit 250 and other components of the NAaaS middleware server 101 via the signal line 225. For example, the message transformation engine 207 transforms the payload from an eXtensible Markup Language (XML) to JavaScript Object Notation (JSON).

The message enhancement engine 209 is software and routines for enhancing messages. In one embodiment, the message enhancement engine 209 is a set of instructions executable by the processor 240 to provide the functionality described below for enhancing messages. In either embodiment, the message enhancement engine 209 is adapted for cooperation and communication with the processor 240, the communication unit 250 and other components of the NAaaS middleware server 101 via the signal line 226.

The message enhancement engine 209 can also enhance the message by adding information not originally present in the request. For example, continuing with the example above, where the user wants to project an image onto a projector that requires additional authentication information, the message enhancement engine 209 retrieves the additional authentication information from the data storage 255 and adds it to the message. Once the message is ready, the message enhancement engine 209 transmits the message to the workflow engine 201 in the enterprise service bus 107, which transmits the message to the projector.

NAaaS Application Services

Figure 2B:
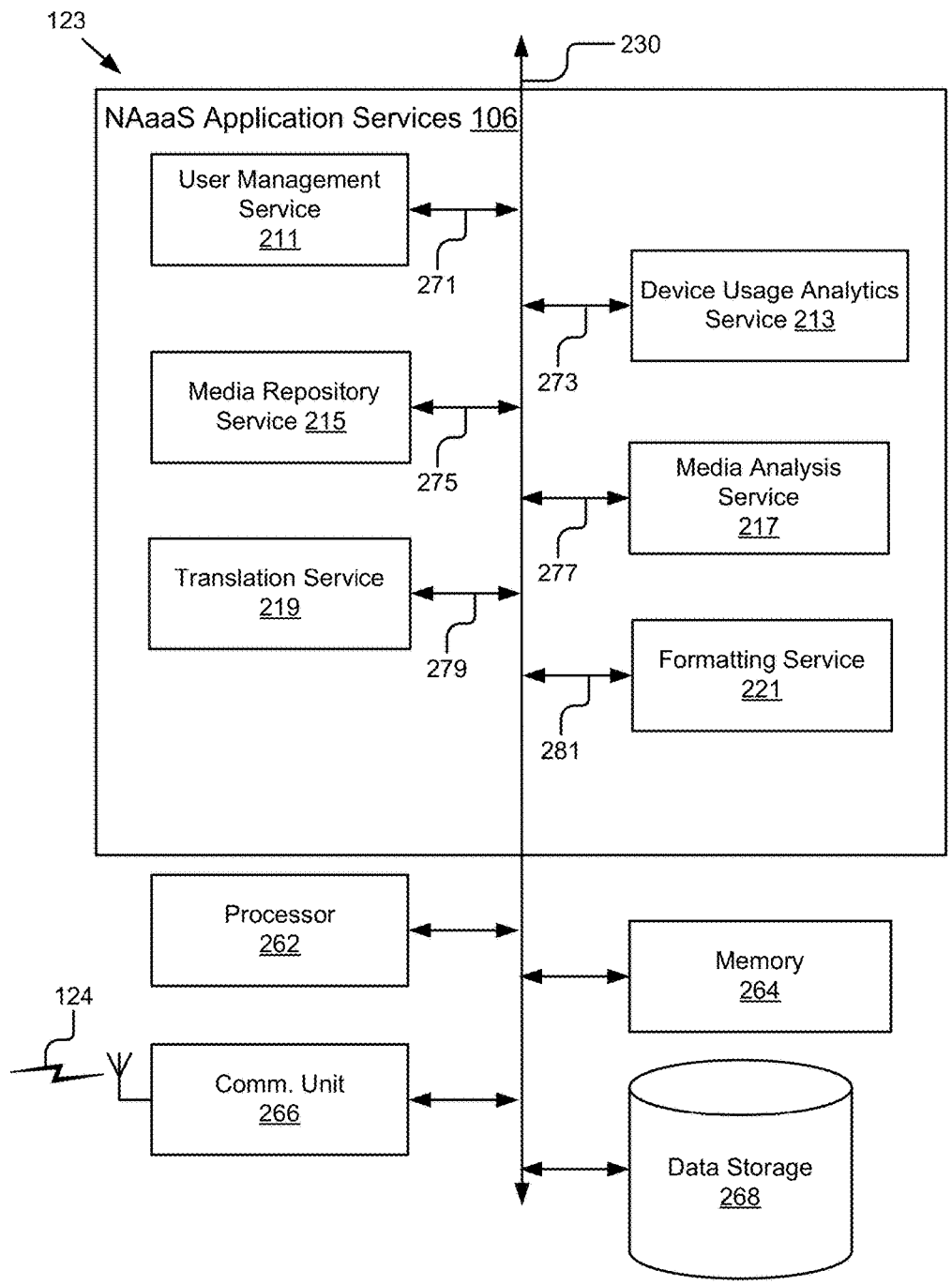
FIG. 2B is a block diagram illustrating one embodiment of a Network Appliance as a Service application.

FIG. 2B illustrates one embodiment of a NAaaS application server 123 that comprises NAaaS application services 106, a processor 262, a memory 264, a communication unit 266 and data storage 268. Some of the components of the NAaaS application server 123 have similar function and form as has been described above with reference to FIG. 2A so like reference numbers and terminology have been used to indicate similar functionality. For example, the communication bus 230, the processor 262, the memory 264 and the communication unit 266 are similar to that described above with reference to FIG. 2A so they will not be described here again.

In one embodiment, the data storage 268 stores device usage entries, an index of the media, the media, text from the media, protocols for translating text, translated text and user profiles. The device usage entry describes transactions executed on the collaborative computing devices 103 and user identifiers associated with the transaction. In some embodiments, the device usage entry includes multiple user identifiers. For example, the device usage entry includes a user identifier for the presenter, e.g. a first user that sends a request from a user device 102 to project an image, video or document to a collaborative computing device 103 and a user identifier for the author of the media. The device usage entry includes the type of request (e.g., project, power on, power off, etc.), the type of device involved in the exchange of request and service (e.g., smart phone, projector, etc.), an IP address for the device, a measure of device resource spent (e.g., time, power, etc.), a type of functionality of the device used (e.g., auto-focus, enhance, imaging, etc.), a type of media exchanged (e.g., a presentation program document, a text document, a spreadsheet document, a video recording, an audio recording, an image, etc.), etc.

In one embodiment, the data storage 268 stores an index of keywords associated with the media. For example, media may include images of a document or slide show, interactive whiteboard images, video, audio, etc. In some embodiments, the index of keywords includes records of keywords and/or synonyms and an association between a keyword and one or more related media. For example, a record may include the keyword and a pointer data associated with the one or more related media. Pointer data may include document/file identifiers or uniform resource locators for locating the related media in the cloud. In one embodiment, the data storage 268 receives the index of keywords.

The data storage 268 stores an index of media. In one embodiment, the index of media includes records for each media including metadata for each media. For example, the metadata may include pointer data for accessing the original media (e.g. a full presentation instead of merely an image of a slide of the presentation) from the cloud, an author of the media, etc. In one embodiment, the metadata also includes results from the media analysis service 217, such as a text version of the image. In one embodiment, the data storage 268 also stores a copy of the media included in the requests. For example, the data storage 268 receives a copy of the media from the media repository service 215.

In one embodiment, the data storage 268 stores translation data. The translation data may include data related to a plurality of languages. In one embodiment, the data includes a dictionary database that includes equivalencies of a word, phrase or sentence between one language and one or more other languages. For example, a record in the data dictionary may store the English word "printer" and equivalent words for "printer" in other languages (e.g., the German word "drucker," the Spanish word "impresora," the French word "imprimeur"). An equivalent word or phrase of a word or phrase in one language may be retrieved based on the word and the other language. In another embodiment, the equivalent word or phrase may be retrieved based on a synonym for the word.

In one embodiment, the translation data includes syntax and grammar rules for one or more languages. The syntax and grammar rules include rules associated with principles of sentence structure for a language. For example, the syntax rules may include the order of the subject, object and verb in a sentence. The syntax and grammar rules may include rules for verb tenses for a language. In another embodiment, the translation data includes rules for translating the phrases or sentences from one language to another. The rules may be based on the syntax and grammar rules of each language.

The data storage 268 stores user profiles. In one embodiment, the user profiles include records for each user. The records for each user may include a graphical representation of the user (e.g. a photo of the user), name, a title, keywords related to the user, media associated with the user (e.g., media authored by the user or media presented by the user), presentations associated with the user, etc. In one embodiment, the keywords related to the user include a list of keywords.

The NAaaS application services 106 is a collection of individual lower-level services with individual application programming interfaces (APIs) that are composed by the enterprise service bus 107 to deliver higher services. For example, a "project" command sent by a user device 107 to the enterprise service bus 107 will invoke a module in the NAaaS application services 106 that will authenticate the user device, identify text in the media and save the document in the data storage 268. The services do not communicate with each other. Instead the services receive instructions from the enterprise service bus 107, complete the requested task, save data in the data storage 268 if applicable and return information to the enterprise service bus 107.

In one embodiment the services include a user management service 211, a device usage analytics service 213, a media repository service 215, a media analysis service 217, a translation service 219 and a formatting service 221. Persons of ordinary skill in the art will recognize that the NAaaS application services 106 can compose additional services to complete requests.

The user management service 211 is code and routines for registering users in the network 104 and performing authentication of users. In one embodiment, the user management service 211 is a set of instructions executable by the processor 262 to provide the functionality described below for registering users. In another embodiment, the user management service 211 is stored in the memory 264 and is accessible and executable by the processor 262. In either embodiment, the user management service 211 is adapted for cooperation and communication with the processor 262 and the communication unit 266 via signal line 271.

The user management service 211 receives user information and generates a user profile. For example, the user management service 211 receives a name of the user, a user name, a password and any user devices 102 that are associated with the user.

The user management service 211 performs authentication. For example, a user enters login credentials into a user interface on the user device 102. The user device 102 transmits the login credentials to the enterprise service bus 107, which requests that the user management service 211 authenticate the user based on the login credentials. The user management service 211 identifies the user associated with the user device 102, compares the login credentials to the user profile and either sends a confirmation back to the enterprise service bus 107 that the login credentials were correct or a notification that there was a login error. The confirmation includes the user identification associated with the user.

The device usage analytics service 213 is code and routines for logging device usage entries associated with the requests in the network 104. In one embodiment, the device usage analytics service 213 is a set of instructions executable by the processor 262 to provide the functionality described below for logging device usage entries. In another embodiment, the device usage analytics service 213 is stored in the memory 264 and is accessible and executable by the processor 262. In either embodiment, the device usage analytics service 213 is adapted for cooperation and communication with the processor 262 and the communication unit 266 via signal line 273.

The device usage analytics service 213 receives a request and a user identifier associated with the request and logs the metadata associated with the request as a device usage entry. If the user associated with the request is different from the author of the media, the device usage entry includes a user identifier for both the presenter and the author of the media. For example, a doctor gives a talk about a medical subject to residents at a hospital by using slides that are transmitted from the professor's user device 102 (e.g. a laptop) to a collaborative computing device 103 (e.g. a projector). Each time the doctor wants to display a slide on the projector, the doctor sends a request to display an image of the slide from the laptop to the projector. The enterprise service bus 107 transmits the request to the user management service 211, which identifies the user associated with the user device 102. The enterprise service bus 107 receives a confirmation of authentication from the user management service 211 and an identity of the user and transmits the request and user identifier to the device usage analytics service 213, which logs a device usage entry. In one embodiment, the device usage entry includes a user identifier for the user associated with the user device 102, an author of the media (if different), a set of actions performed on the collaborative computing device 103 and a unique identifier referring to the stored media in the data storage 268.

The media repository service 215 is code and routines for storing media associated with a request in data storage 268. In one embodiment, the media repository service 215 is a set of instructions executable by the processor 262 to provide the functionality described below for storing media. In another embodiment, the media repository service 215 is stored in the memory 264 and is accessible and executable by the processor 262. In either embodiment, the media repository service 215 is adapted for cooperation and communication with the processor 262 and the communication unit 266 via signal line 275.

The media repository service 215 receives a request from the enterprise service bus 107 that includes media. The media repository service 215 generates a unique identifier associated with the media and stores the media in the data storage 268.

The media analysis service 217 is code and routines for analyzing media. In one embodiment, the media analysis service 217 is a set of instructions executable by the processor 262 to provide the functionality described below for analyzing media. In another embodiment, the media analysis service 217 is stored in the memory 264 and is accessible and executable by the processor 262. In either embodiment, the media analysis service 217 is adapted for cooperation and communication with the processor 262 and the communication unit 266 via signal line 277.

The media analysis service 217 receives media associated with a request from the enterprise service bus 107. For example, the media analysis service 217 receives an image that was captured from a slide. The media analysis service 217 applies optical character recognition to the image to identify text associated with the image. The media analysis service 217 stores the text in the data storage 268. In one embodiment, the media analysis service 217 converts content from the image including handwritten, typewritten or printed text to machine-encoded text.

In one embodiment, the media analysis service 217 receives video and/or audio data. The media analysis service 217 may identify a user associated with the video and/or audio data received from a video conferencing device. For example, a video may include the doctor from the example above giving the presentation in front of an interactive whiteboard. The media analysis service 217 may identify the doctor based on performing facial recognition on the video data or performing voice analysis on the audio data. In another embodiment, the media can be provided by audience members that participate in an event. The media analysis service 217 determines an event. For example, the media analysis service 217 determines a presentation. The media analysis service 217 determines audience members at an event. In some embodiments, the media analysis service 217 determines audience member attendance based on location of a user device 102. The media analysis service 217 determines which audience members participated in the event. In one embodiment, the media analysis service 217 determines which audience members participated in an event based on performing facial recognition from video data or performing voice analysis on the audio data.

In one embodiment, the media analysis service 217 receives video data of an event or a presentation from the enterprise service bus 107. For example, the video includes a person in front of an interactive whiteboard for presenting information. The media analysis service 217 may perform face recognition on one or more frames of the video. For example, the media analysis service 217 performs optical character recognition on the information presented on the interactive whiteboard. In another embodiment, the media analysis service 217 receives audio data. The media analysis service 217 may identify text from the audio data by using speech-to-text technology.

The translation service 219 is code and routines for translating content. In one embodiment, the translation service 219 is a set of instructions executable by the processor 262 to provide the functionality described below for translating content. In another embodiment, the translation service 219 is stored in the memory 264 and is accessible and executable by the processor 262. In either embodiment, the translation service 219 is adapted for cooperation and communication with the processor 262 and the communication unit 266 via the signal line 279. The translation service 219 is described below in more detail with reference to FIG. 2C.

Figure 2C:
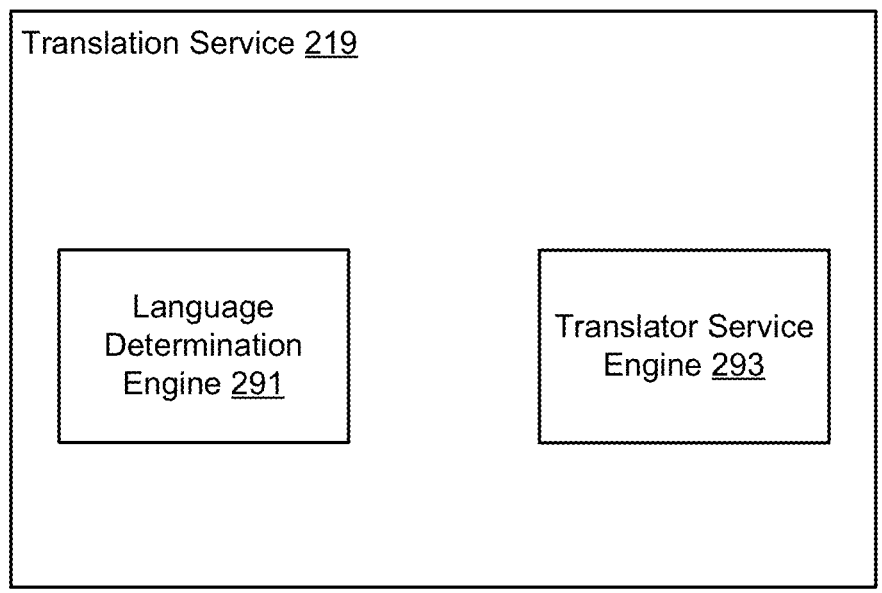
FIG. 2C is a block diagram illustrating an example translation service.

FIG. 2C is a block diagram of one embodiment of a translation service 219. In one embodiment, the translation service 219 includes a language determination engine 291 and a translator service engine 293. However, in other embodiments, the translation service 219 can include different and/or additional modules than the ones depicted in FIG. 2C.

The language determination engine 291 receives media from the workflow engine 201 or the data storage 268. In one embodiment, the language determination engine 291 receives an image of a document with content in a first language from the workflow engine 201 that originated with a user device 102. For example, a product manager for an electronics company gives a presentation about new products developed by his/her team. The audience may include people off-site from the location of the product manager. For example, the product manager may be presenting at a site located in California. The audience may include people in the same room as the product manager and others that are remote from the room. For example, the audience may include executives of the company in Germany. The product manager gives the presentation by using slides with content in the English language that are transmitted from the product manager's user device 102 (e.g., a smart phone) to the enterprise service bus 106 to a collaborative computing device 103 (e.g., a projector). The product manager may capture a screenshot of the user device 102, take a picture of an image or retrieve an image from storage on the user device 102. The collaborative computing device 103 may be for displaying the images for viewing by the executives located in Germany.

The language determination engine 291 determines a second language for translation. In one embodiment, the language determination engine 291 determines the second language based on input data from a user. For example, the language determination engine 291 receives user input of the selection based on a user interface. An example of user interface is described below in more detail with reference to FIG. 3. The user input may include data describing one or more second languages for translation.

In another embodiment, the language determination engine 291 determines the second language by identifying a recipient for the image. The language determination engine 291 may determine the second language based on the recipient. For example, the language determination engine 291 determines the second language based on a collaborative computing device 103 for displaying the image. In one embodiment, the determination engine 291 determines the second language based on the location the collaborative computing device 103. For example, the language determination engine 291 determines that a second language is German for a collaborative computing device 103 having a location in Germany. In another example, the collaborative computing device 103 is registered with the system and associated with a language at the time of registration and the language determination engine 291 determinates the language based on the registration information associated with the registered collaborative computing device 103.

In another embodiment, the language determination engine 291 determines the second language based on one or more users near the collaborative computing device 103. For example, the language determination engine 291 determines the second language based on user devices 102 near the collaborative computing device 103. The language determination engine 291 may determine the second language based on users or user profiles associated with the user devices 102. In one embodiment, the language determination engine 291 determines the second language based on a most common language that is requested at a location of the collaborative computing device 103.

The translator service engine 293 determines content within the image for translation. In one embodiment, the translator service engine 293 determines the content within the image for translation by parsing the image into one or more parts. For example, the translator service engine 293 parses the image into text parts and object or non-text parts.

The translator service engine 293 performs translation on the content to the second language. The translator service engine 293 may translate the content based on translation data. For example, the translator service engine 293 may search a database dictionary including equivalencies of a word, phrase or sentence between the first language and the second language. In other embodiment, the translator service engine 293 translates the content based on syntax and grammar rules for each language. In another embodiment, the workflow engine 201 transmits the content to the third-party translator service 109 for translation.

The formatting service 221 is code and routines for formatting images. In one embodiment, the formatting service 221 is a set of instructions executable by the processor 262 to provide the functionality described below for formatting images. In another embodiment, the formatting service 221 is stored in the memory 264 and is accessible and executable by the processor 262. In either embodiment, the formatting service 221 is adapted for cooperation and communication with the processor 262 and the communication unit 266 via the signal line 281.

The formatting service 221 generates a new version of the image including content in the second language. In one embodiment, the formatting service 221 formats the new version of the image in a layout similar to an original version of the image. For example, the formatting service 221 determines a position for formatting the content in the second language in the new version of the image based on a similar position of the text in the first language in the original version. In another embodiment, the formatting service 221 determines a position for formatting non-text or icons in the new version of the image based on a similar position of the non-text or icons in the original image.

FIG. 3 is a graphic representation 300 of an example of a user interface for specifying a language that is generated by the user interface engine 121 on the web server 120. A user device 102 displays the user interface for specifying the language. In one embodiment, the user device 102 is a smart phone. The user interface includes a device input 302 for specifying a collaborative computing device 103 or a recipient. A user of the device 102 inputs data in device input 302 for specifying a recipient for displaying the image 306. The user interface includes a language input 304 for specifying the language for translation. In the illustrated embodiment, the language input 304 includes a drop-down box for selecting one or more languages for translation. In the illustrated embodiment, the user specifies "German" for the language for translation. The image 306 can include one or more parts including text 308 and non-text 310. In the illustrated embodiment, the image 306 includes text 308 in the English language.

Figure 4:
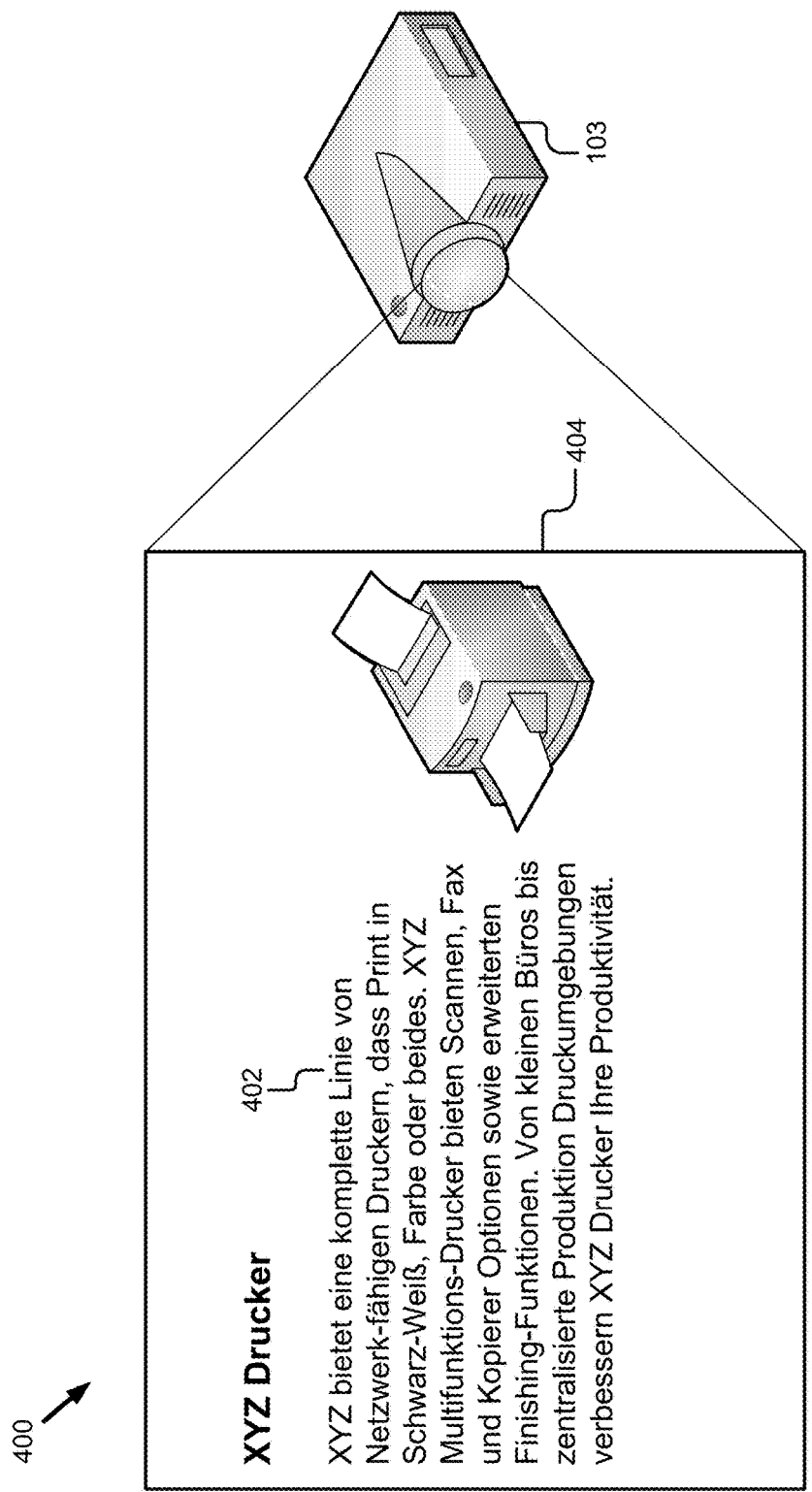
FIG. 4 is a graphic representation of one embodiment of a user interface of translated and formatted content.

FIG. 4 is a graphic representation 400 of translated and formatted content that is generated by the user interface engine 121 on the web server 120. A collaborative computing device 103 (e.g., a projector) receives the translated and formatted content. The collaborative computing device 103 displays an image 404 including the translated and formatted content. In the illustrated embodiment, the image 404 includes a new version of the image 306 in FIG. 3. The translated text 402 includes a German translation of the text 308 in the English language. The image 404 may include a format similar to the original layout of the image 306. For example, the translated text 402 can be located in a similar position as the original text 308 of the image 306. In another embodiment, non-text or icons can be located in a similar position as the original image 306.

Methods

Figure 5:
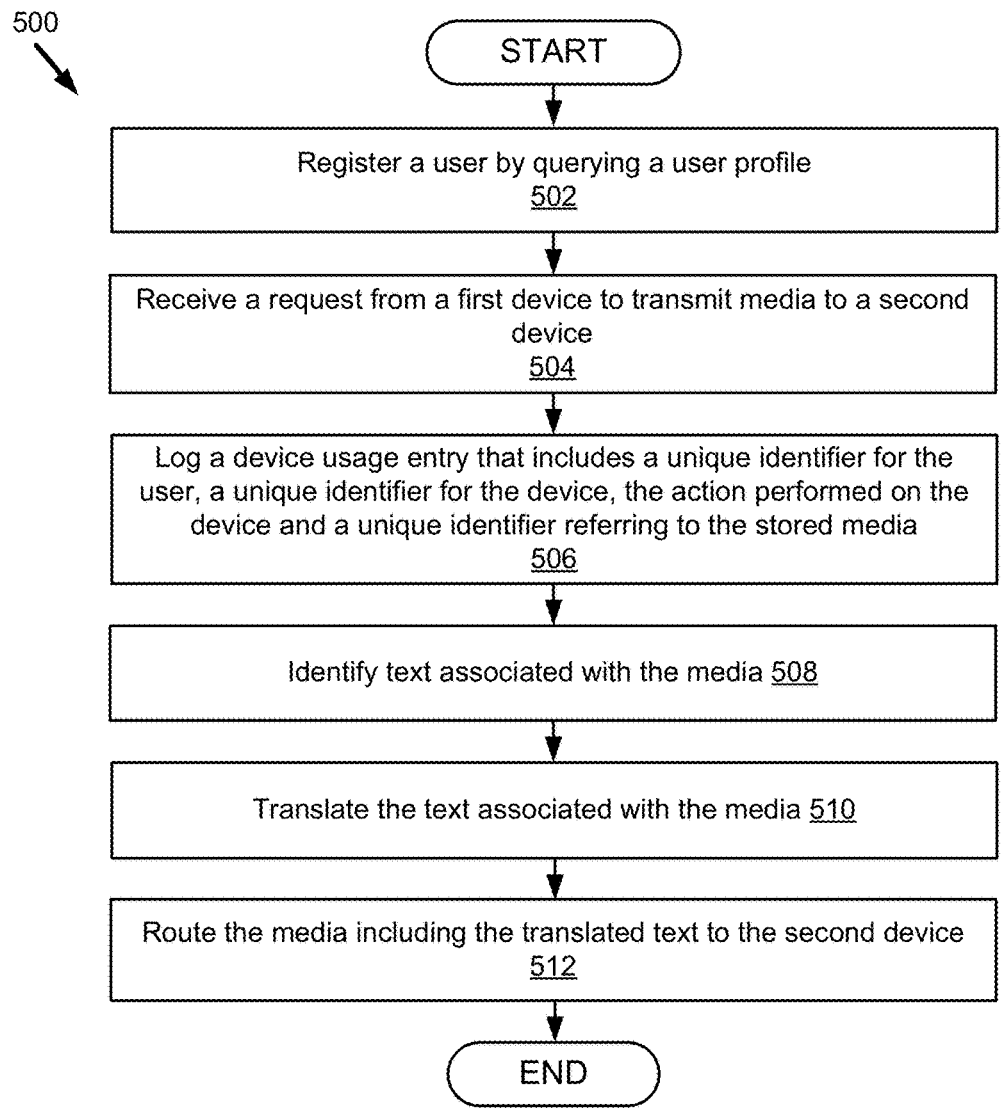
FIG. 5 is a flow diagram of one embodiment of a method for registering a user and routing translated content to a second device.
Figure 6:
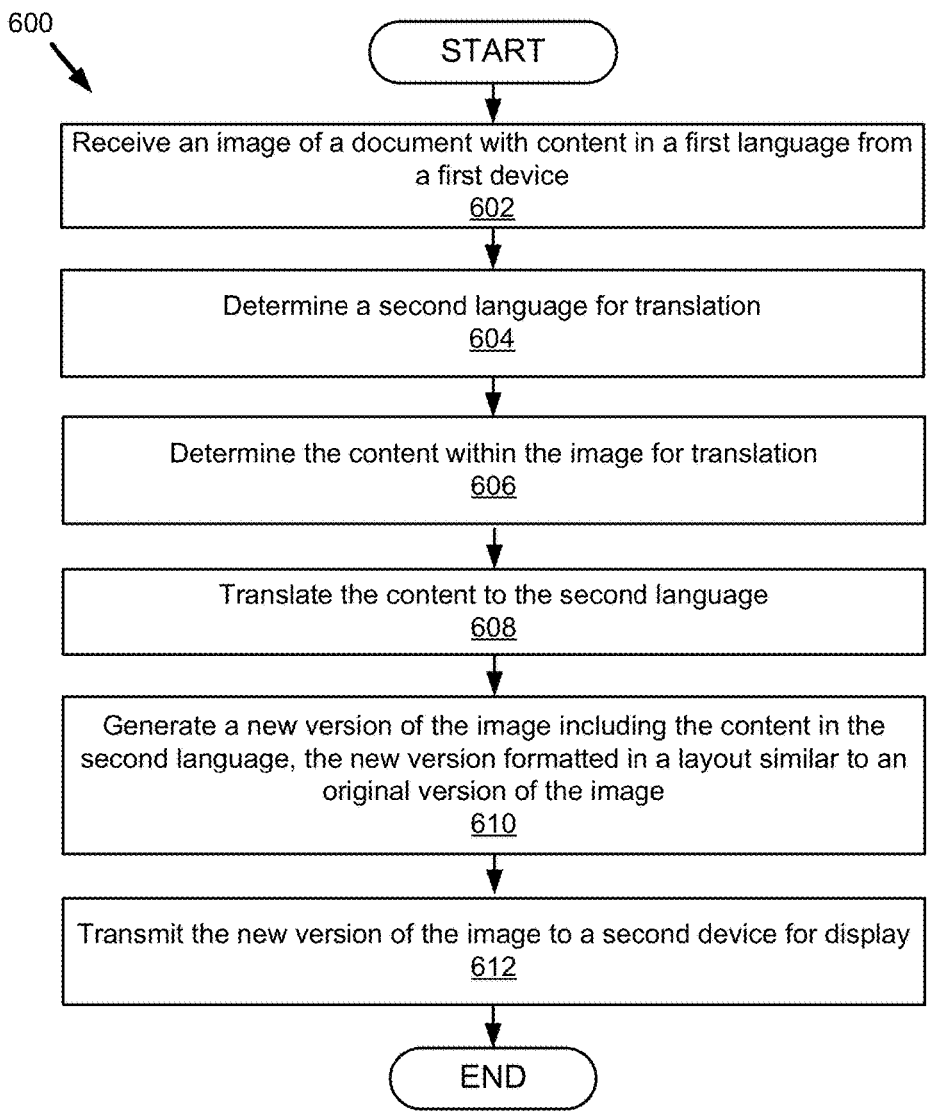
FIG. 6 is a flow diagram of an embodiment of a method for translating and formatting content.
Figure 7:
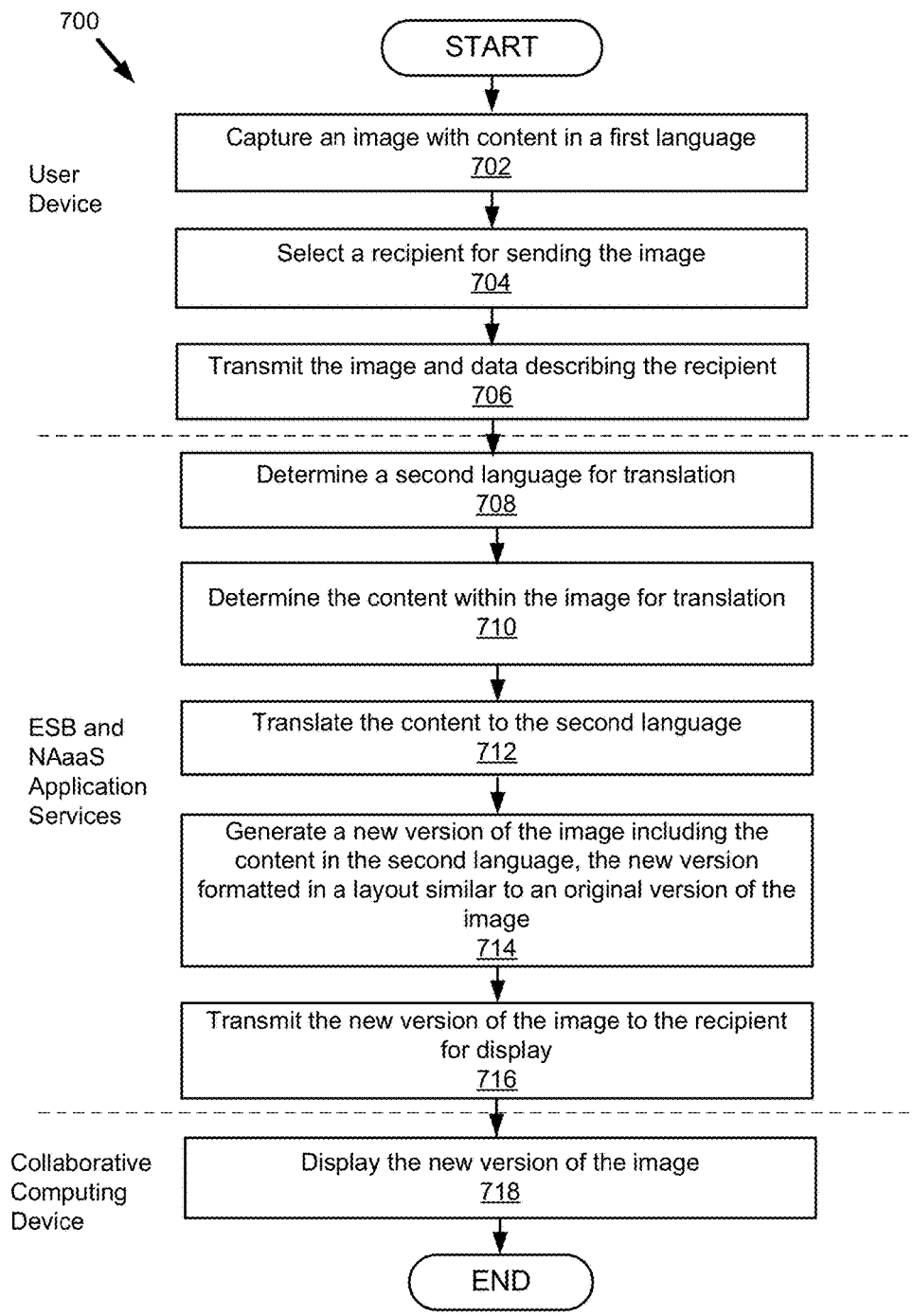
FIG. 7 is a flow diagram of another embodiment of a method for translating and formatting content.

Referring now to FIGS. 5-7, various embodiments of the methods of translating and formatting content are described.

FIG. 5 is a flow diagram 500 of an embodiment of a method for translating media using an enterprise service bus 107 and NAaaS application services 106. The enterprise service bus 107 includes a workflow engine 201, a device management engine 203, a protocol adaptation engine 205, a message transformation engine 207 and a message enhancement engine 209. The NAaaS application services 106 include a user management service 211, a device usage analytics service 213, a media repository service 215, a media analysis service 217, a translation service 219 and a formatting service 221.

The workflow engine 201 receives user information from a user associated with a user device 102. The workflow engine 201 instructs the user management service 211 to register the user. The user management service 211 registers 502 the user by querying a user profile. The user profile includes information about the user, for example, the user's name, a unique identifier associated with the user, the user's login information, etc.

The workflow engine 201 receives 504 a request from a first device to transmit media to a second device. For example, the user device 102 transmits a request to the workflow engine 201 for instructing the collaborative computing device 103 to project a translated image. In one embodiment, the workflow engine 201 instructs the media repository service 215 to save the media associated with the request. The workflow engine 201 instructs the device usage analytics service 213 to log 506 a device usage entry that includes a unique identifier for the user, a unique identifier for the device, the action performed on the device and a unique identifier referring to the stored media. In one embodiment, the workflow engine 201 receives the request during a presentation or meeting. For example, the presentation may include a professor giving a lecture related to one or more subjects. The professor uses a smart phone for requesting to transmit an image to a projector for display. The image may include one or more slides related to the lecture.

The workflow engine 201 instructs the media analysis service 217 to identify 508 text associated with the media. For example, the media analysis service 217 performs optical character recognition on images to identify text. In some embodiments, the images are frames of a video, for example, in a situation where the media analysis service 217 is identifying text from a video of an interactive whiteboard. In another example, the media analysis service 217 performs speech-to-text conversion of audio associated with a presentation.

The workflow engine 201 instructs the translation service 219 to translate 510 the text associated with the media. In one embodiment, the user specified that the first language was to be translated to a second language. In another embodiment, the translation service 219 identifies the second language based on the location where the media is to be sent. For example, if the projector is in Germany, the translation service 219 translates the first language into German. In yet another embodiment, the translation service 219 determines the second language based on a most commonly requested language for a particular region. For example, in an office in the United States where Japanese employees often visit, the translation service 219 translates the first language into Japanese. This may be automatic where the conference room has two projectors: one for the first language and one for the second language. The translation service 219 transmits the translated text to the workflow engine 201, which routes 512 the media including the translated text to the second device.

FIG. 6 is a flow diagram 600 of an embodiment of a method for translating and formatting content using an enterprise service bus 107 and NAaaS application services 106. FIG. 6 is a more detailed explanation of steps 508 and 510 in FIG. 5. The enterprise service bus 107 includes a workflow engine 201. The NAaaS application services 106 include a user management service 211, a device usage analytics service 213, a media analysis service 217, a translation service 219 and a formatting service 221.

The workflow engine 201 receives 602 an image of a document with content in a first language from a first device. The workflow engine 201 instructs the translation service 219 to determine 604 a second language for translation, for example, by using some of the techniques mentioned above with reference to FIG. 5. The workflow engine 201 instructs the translation service 219 to determine 606 the content within the image for translation. The translation service 219 translates 608 the content to the second language. The workflow engine 201 instructs the formatting service 221 to generate 610 a new version of the image including the content in the second language. For example, the image is of a PowerPoint slide with a company's logo embedded into the top of the image and includes a colorful background with a border. The formatting service 221 generates an image that includes the company's logo and the colorful background and inserts the translated text into the same area as the original text. The formatting service 221 transmits the new version of the image to the workflow engine 201, which transmits 612 the new version of the image to a second device for display.

FIG. 7 is a flow diagram 700 of an embodiment of a method for translating and formatting content. In this embodiment, the steps are performed by a user device 102, an enterprise service bus 107, NAaaS application services 106 or a collaborative computing device 103.

A user device 102 captures 702 an image with content in a first language. For example, a user captures a screenshot on a mobile device of a printed piece of paper by taking a picture of the image or selecting the image from storage on the user device. The user device 102 selects 704 a recipient for sending the image. For example, the device management engine 203 on the enterprise service bus 107 transmits a list of available collaborative computing devices 103 to the user device 102. The user device 102 transmits 706 the image and data describing the recipient.

The workflow engine 201 on the enterprise service bus 107 instructs the translation service 219 to determine 708 a second language for translation. In one embodiment, the second language is based on input data from a user. In another embodiment, the second language is based on a recipient for the image. The media analysis service 217 determines 710 the content within the image for translation for example by identifying text regions and performing optical character recognition. The translation service 219 translates 712 the content to the second language. The workflow engine 201 instructs the formatting service 221 to generate 714 a new version of the image including the content in the second language, the new version formatted in a layout similar to an original version of the image. The workflow engine 201 transmits 716 the new version of the image to the recipient for display. The collaborative computing device 103 displays 718 the new version of the image.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, with one or more processors, a request from a first device to transmit visual media to a second device at a first location and a third device at a second location, a user profile associated with a user of the second device, and an original version of the visual media including content in a first language, wherein the original version of the visual media includes a frame of a video stream;
determining, with the one or more processors, a second language for translation based on the user profile;
determining, with the one or more processors, a first text content and a non-text content from the visual media, wherein determining the first text content includes converting handwritten characters, drawn on an interactive surface in the frame of the video stream, into machine encoded text;
translating, with the one or more processors, the first text content in the first language to a second text content in the second language;
determining, with the one or more processors, a text content position for the second text content in a new version of the visual media based on a position of the first text content in the original version of the visual media;
determining, with the one or more processors, a non-text content position for the non-text content in the new version of the visual media based on a position of the non-text content in the original version of the visual media;
generating, with the one or more processors, the new version of the visual media using the text content position and the non-text content position, the new version of the visual media including the second text content in the second language and the non-text content, the new version formatted in a layout similar to the original version of the visual media; and
transmitting, with the one or more processors, the new version of the visual media to the second device for display and the original version of the visual media to the third device for display.

2. The method of claim 1, wherein determining the second language further comprises:
determining a recipient for the visual media; and
identifying the second language of the recipient based on the recipient.

3. The method of claim 2, wherein identifying the second language of the recipient is based on the first location of the second device associated with the recipient.

4. The method of claim 2, wherein identifying the second language of the recipient is based on a most common language that is requested at the first location.

5. The method of claim 1 further comprising:
identifying the second device at the first location; and
identifying the third device at the second location.

6. The method of claim 1, wherein the visual media is an image and the first device captures the image by capturing a screenshot on the first device, taking a picture of a document or selecting the image from storage on the first device.

7. The method of claim 1, wherein determining the second language for translation is based on the request from a user associated with the first device.

8. A system comprising:
one or more processors;
an enterprise service bus executable by the one or more processors, the enterprise service bus configured to receive a request from a first device to transmit visual media to a second device at a first location and a third device at a second location, a user profile associated with a user of the second device, and an original version of the visual media including content in a first language, wherein the original version of the visual media includes a frame of a video stream; and application services executable by the one or more processors, the application services configured to receive the request from the enterprise service bus, determine, a second language for translation based on the user profile, determine a first text content and a non-text content from the visual media, wherein to determine the first text content, the application services convert handwritten characters, drawn on an interactive surface in the frame of the video stream, into machine encoded text, translate the first text content in the first language to a second text content in the second language, determine a text content position for the second text content in a new version of the visual media based on a position of the first text content in the original version of the visual media, determine a non-text content position for the non-text content in the new version of the visual media based on a position of the non-text content in the original version of the visual media, and generate the new version of the visual media using the text content position and the non-text content position, the new version of the visual media including the second text content in the second language and the non-text content, the new version formatted in a layout similar to the original version of the visual media; and wherein the enterprise service bus is further configured to transmit the new version of the visual media to the second device for display and the original version of the visual media to the third device for display.

9. The system of claim 8, wherein determining the second language further comprises:
determining a recipient for the visual media; and
identifying the second language of the recipient based on the recipient.

10. The system of claim 9, wherein identifying the second language of the recipient is based on the first location of the second device associated with the recipient.

11. The system of claim 9, wherein identifying the second language of the recipient is based on a most common language that is requested at the first location.

12. The system of claim 8, wherein the application services are further configured to identify the second device at the first location and identify the third device at the second location.

13. The system of claim 8, wherein the visual media is an image and the first device captures the image by capturing a screenshot on the first device, taking a picture of a document or selecting the image from storage on the first device.

14. The system of claim 8, wherein determining the second language for translation is based on the request from a user associated with the first device.

15. A computer program product comprising a non-transitory computer usable medium including a computer readable program, wherein the computer readable program when executed on a computer causes the computer to:

receive a request from a first device to transmit visual media to a second device at a first location and a third device at a second location, a user profile associated with a user of the second device, and an original version of the visual media including content in a first language, wherein the original version of the visual media includes a frame of a video stream;

determine a second language for translation based on the user profile;

determine a first text content and a non-text content from the visual media, wherein to determine the first text content the computer readable program further causes the computer to convert handwritten characters, drawn on an interactive surface in the frame of the video stream, into machine encoded text;

translate the first text content in the first language to a second text content in the second language;

determine a text content position for the second text content in a new version of the visual media based on a position of the first text content in the original version of the visual media;

determine a non-text content position for the non-text content in the new version of the visual media based on a position of the non-text content in the original version of the visual media;

generate the new version of the visual media using the text content position and the non-text content position, the new version of the visual media including the second text content in the second language and the non-text content, the new version formatted in a layout similar to the original version of the visual media; and transmit the new version of the visual media to the second device for display and the original version of the visual media to the third device for display.

16. The computer program product of claim 15, wherein determining the second language further comprises:
determining a recipient for the visual media; and
identifying the second language of the recipient based on the recipient.

17. The computer program product of claim 16, wherein identifying the second language of the recipient is based on the first location of the second device associated with the recipient.

18. The computer program product of claim 16, wherein identifying the second language of the recipient is based on a most common language that is requested at the first location.

19. The computer program product of claim 15, wherein the computer readable program when executed on the computer, causes the computer to:
identify the second device at the first location; and
identify the third device at the second location.

20. The computer program product of claim 15, wherein the visual media is an image and the first device captures the image by capturing a screenshot on the first device, taking a picture of a document or selecting the image from storage on the first device.

* * * * *